United States Patent [19]
Lykes

[11] 3,846,652
[45] Nov. 5, 1974

[54] UNITARY LUBRICATING AND DUST CAP ASSEMBLY

[75] Inventor: Robert E. Lykes, Tipp City, Ohio

[73] Assignee: A. O. Smith Corporation, Milwaukee, Wis.

[22] Filed: Jan. 15, 1974

[21] Appl. No.: 433,554

[52] U.S. Cl................. 310/90, 310/43, 310/88, 310/89, 308/125
[51] Int. Cl............................................. H02k 5/16
[58] Field of Search.......... 310/88, 89, 90, 254, 43, 310/42; 308/125, 132

[56] References Cited
UNITED STATES PATENTS

| | | |
|---|---|---|
| 2,323,146 | 6/1943 | Manney ................ 310/88 |
| 2,381,070 | 8/1945 | Lyden .................. 308/125 |
| 2,685,658 | 8/1954 | Feiertag .............. 308/125 X |
| 2,698,393 | 12/1954 | Merke .................. 310/89 |
| 2,845,552 | 7/1958 | Robinson .............. 310/90 |
| 2,945,729 | 7/1960 | Mitchell .............. 310/90 X |
| 3,258,621 | 6/1966 | Potter .................. 310/90 |
| 3,270,227 | 8/1966 | Kaeding ................ 308/125 X |
| 3,714,705 | 2/1973 | Lewis ................... 310/90 X |
| 3,758,799 | 9/1973 | Dochterman et al. ... 310/43 X |

FOREIGN PATENTS OR APPLICATIONS 976,348  11/1964  Great Britain ................ 310/90

*Primary Examiner*—Donovan F. Duggan
*Attorney, Agent, or Firm*—Andrus, Sceales, Starke & Sawall

[57] ABSTRACT

An oil and dust cap for mounting on the end of an electric motor which includes an oil tube, an oil tube cap, a dust cap with a sump and a hub, all of which are formed in one piece from a plastic material such as polypropylene. The assembly is secured to the end frame of the motor by bolts or screws, or by ultrasonic or heat staking and is utilized especially with sleeve bearing motors. An annular flange may be provided on the outside of the end cap to receive a resilient mount and clips to resiliently mount a motor on a U-shaped base.

7 Claims, 8 Drawing Figures

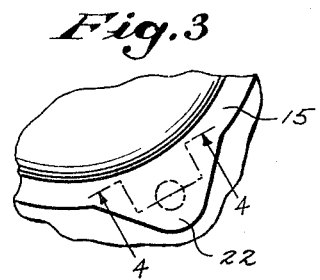
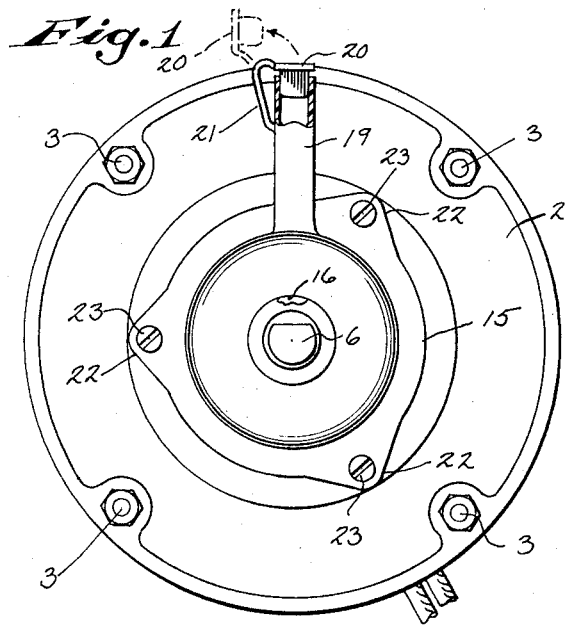
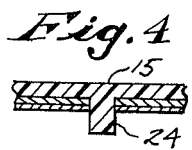
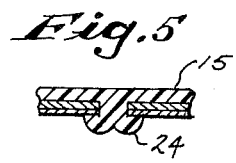
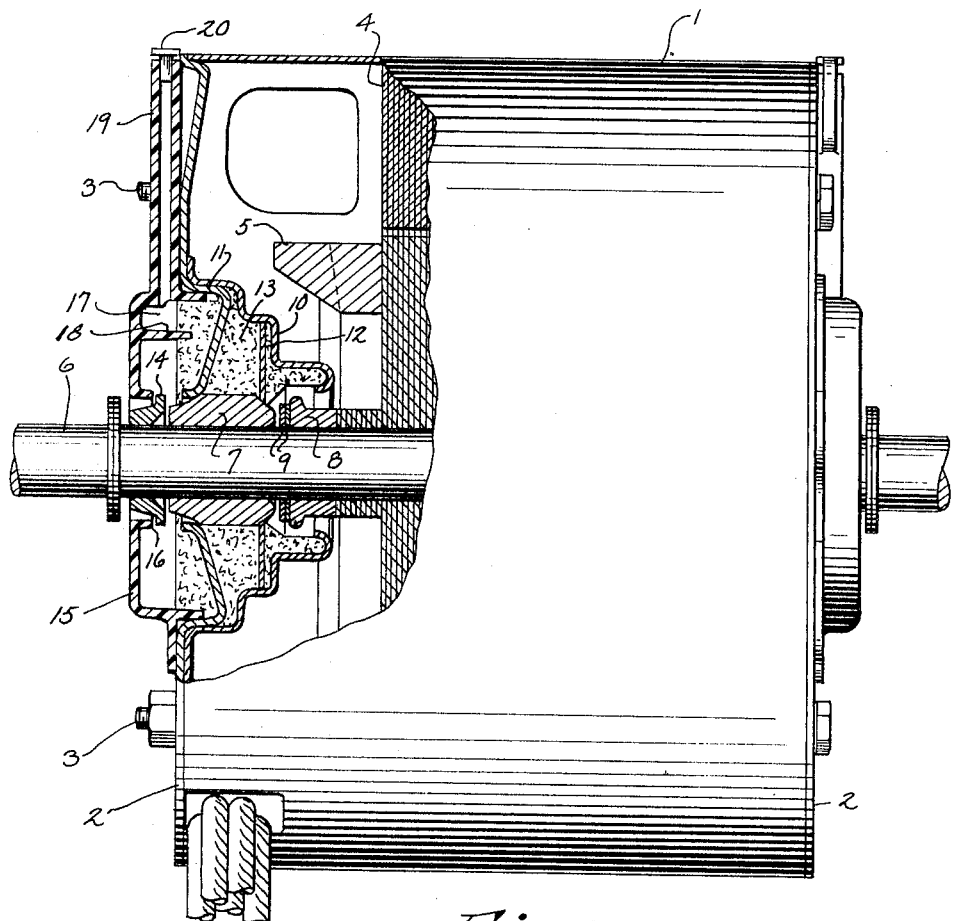

UNITARY LUBRICATING AND DUST CAP ASSEMBLY

BACKGROUD F THE INVENTION

This invention relates to a one piece plastic oil and dust cap to be applied to a dynamoelectric machine such as sleeve bearing motor.

Stamped steel end frames for electric motors are now being used by many manufactuers. Oiling provision for the sleeve bearings employed in such motors use separate pieces to provide for oiling of the bearings which includes the oil tube, oil tube cap or plug, clip or clamp to hold the oil tube, external dust cap and a special hub for mounting rings. With this construction leakage of water into the motor and oil out of the motor is a major concern requiring a sealant where the oil tube enters the dust cap or end frame.

The invention of a one piece unit which includes the oil cap, oil tube and external dust cap and mounting hub, provides a contruction readily assembled with the motor and overcomes the leakage problem between the tube and dust cap.

SUMMARY OF THE INVENTION

In carrying out the invention, in one form there is provided a one piece plastic oil and dust cap for assembly on the end bell of a motor which has a hub for assembly on the motor shaft, a dust cap surrounding the hub, and an oil tube extending to within the dust cap. The oil tube integrally formed with the hub and cap opens to the inside of the dust cap for delivery of oil and extends to the circumference of the end bell where it is closed by a plug which is secured by a cord or integral hinge to the body of the oil tube. A sump is provided on the inside of the dust cap to receive the oil delivered from the oil tube. The dust cap may be of various shapes. The one illustrated in FIGS. 1 and 7 is of irregular shape with three projecting portions and is secured to the end ball or frame of the motor by rivets or screws. The dust cap also may be secured to the motor and bell by nibs or bosses on the cap which extend through the end frame and are mushed down by ultrasonic or heat staking to secure the assembly to the motor end frame. The construction is illustrated in FIGS. 3-5.

In the second embodiment, again, all the parts of the oil and dust cap are a one piece plastic unit. In this embodiment, however, an annular flange is integrally provided on the outside of the unit for mounting the motor to a base.

BRIEF DESCRIPTION OF THE DRAWING

FIG. 1 is an end view of a motor with parts in section of the oil and dust cap with the assembly secured to the end bell by screws;

FIG. 2 is a view taken longitudinally through a motor with parts in section and parts in elevation with the end cap of FIG. 1 shown in section;

FIG. 3 is a fragmentary view of a modified form of means for securing the oil and dust cap to the motor end frame.

FIG. 4 is a section taken on line 4—4 of FIG. 3 and illustrating a boss or nib on the oil and dust cap extending through the end frame;

FIG. 5 is a similar section illustrating one of the bosses staked in position;

DESCRIPTION OF THE INVENTION

Figure 6:
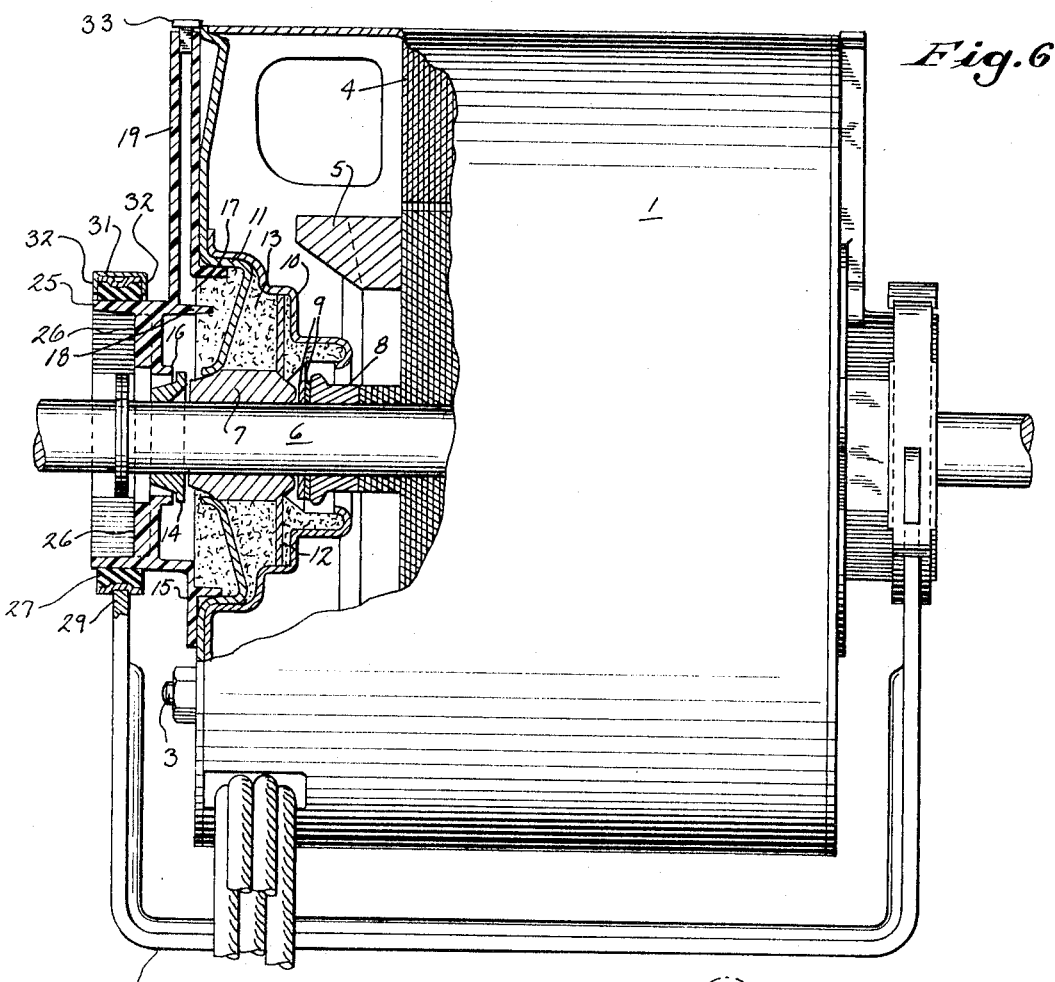
FIG. 6 is a view taken longitudinally through a motor with parts in section and elevation illustrating an oil and dust cap having an annular flange for mounting the motor on a boss.

Referring Now to FIGS. 1 and 2 of the drawing, there is shown an electric motor having a cylindrical shell 1 to which is secured the end frames 2 by the through bolts 3. The motor has the usual stator 4 assembled around the rotor 5.

A shaft 6 extends through the rotor 5 and out through the ends of the motor and is rotated by rotor 5 which is secured to the shaft. Shaft 6 rotates within the sleeve bearing 7 at the end of the motor and end frame 2 extends inwardly to the outer end of the bearing to hold it against outward movement. Inward movement of bearing 7 is prevented by the thrust collar 8 which engages thrust washers 9 located between thrust collar 8 and bearing 7.

An inner dust cap 10 on the inside of the end frame 2 encloses sleeve bearing 7 and is of irregular shape to overlie a portion of the thrust collar 8 and an inward depressed portion 11 of the end frame 2. An annular spring 12 is located between the inner end of the bearing 7 and dust cap 11 to place bearing 7 under an outward tension. The inner dust cap 10 confines a wick 13 of absorbent material to receive the oil which is to be delivered to bearing 7. A slinger 14 is located on shaft 6 outwardly of the bearing 7 to effect radial movement of the lubricating oil which may collect in that area.

The oil and dust cap 15 of the invention is of one piece suitable plastic material such as of polypropylene or the like disposed at the end of the motor and extending radially outwardly from the annular hub 16 which is assembled around shaft 6 and above the outer end of slinger 14.

The outer portion of dust cap 15 on the inside has a sump 17 illustrated in and end view in FIG. 6 formed by a curved flange 18 integrally provided on the dust cap 15 near its upper end which opens to the inside of dust cap 15.

An oil tube 19 is integrally formed with dust cap 15 and extends upwardly from sump 17 to which the inside of tube 19 is connected and terminates adjacent the circumference of the outer surface of the end frame 2. The upper end of tube 19 is closed by a removable plug 20 which is shown as connected to the tube by a plastic retaining cord 21 so that when removed from tube 19, plug 20 will hang from the tube 19 for ready replacement therein.

WWhen oiling of the sleeve bearing 7 is desirable, plug 20 is removed from tube 19 and oil is poured into tube 19. It then passes down the tube to the sump 17 and can then flow gradually into wick 13 at a rate at which the wick is able to absorb the oil to thereby supply the lubricating oil to the sleeve bearing 7.

The one piece construction of the oil and dust cap comprising hub 16, dust cap 15 and oil tube 19 makes for easy assembly of the oil and dust cap with the end frame 2 and the inwardly turned annular flange of the hub 16 of dust cap 15 combines with the slinger 14 to form somewhat of a labyrinth and seal the motor against loss of lubricating oil and entry of dust.

In the embodiment of FIG. 1, the oil and dust cap of the invention has an irregular shape with three projections 22 which are secured to the end frame 2 by the screws 23 as illustrated in FIG. 1. The oil and dust cap may be provided in many different shapes.

FIGS. 3, 4 and 5 illustrate the oil and dust cap staked to the end frame 2 of a motor. The assembly of the oil an dust cap on the end of the motor and the internal parts at the end of the motor are the same as described with respect to FIGS. 1 and 2.

In order to accomplish the staking the oil and dust cap 15 has equi-spaced bosses or nibs 24 which extend to the inside of end frame 2 and are heated by heat or ultrasonics to secure cap 15 to end frame 2 as illustrated in FIG. 5.

Figure 7:
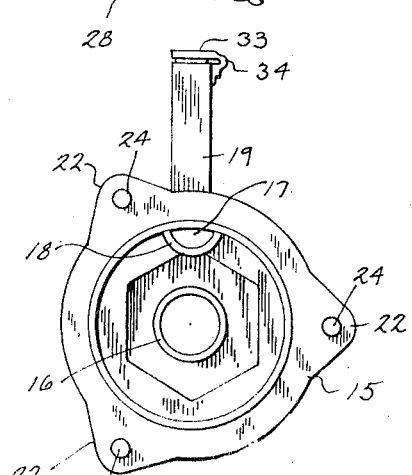
FIG. 7 is an end view of the oil and dust cap of FIG. 6.
Figure 8:
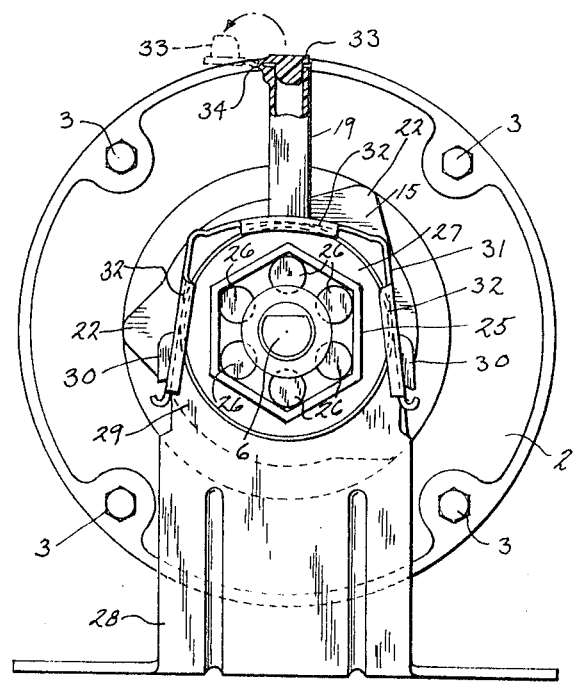
FIG. 8 is an end elevational view of the motor end frame and end cap with the mounting clip in place and securing the motor to a supporting base or bracket.

FIGS. 6, 7 and 8 illustrate an oil and dust cap which corresponds to that of FIG. 1 but has an outwardly projecting integral annular flange 25 of hexagonal shape. The flange 25 is reinforced internally by abutments 26 spaced around the inside of flange 25. Flange 25 receives the annular rubber mount 27.

The purpose of this construction is to resiliently support the motor on the base 28. Base 28 is generally U-shaped and the upper end 29 is of saddle shape to receive the rubber mount 27 supported on the annular flange 25 and the base has the outwardly extending ears 30 at the outer upper end of the saddle. The mounting clip 31 has annular flange 32 which extend over the rubber mount 27. The lower opposite ends of the clip 31 have slots, not shown, which permit the clip to be assembled over ears 30 on the upper end of the base 28 to resiliently secure the motor to base 28.

In the embodiment illustrated in FIGS. 7 and 8, a different type of cap construction is employed to close the upper end of the oil tube 19. As shown in the drawing the cap 33 is integrally secured to the upper end of the oil tube 19 by the hinge 34 to provide an integral construction.

The invention provides an integral plastic oil and dust cap with a hub and dust cap sealing each end of the motor and which may be of various configurations for numerous ways of securing the cap to the end frame. Integrally molded to the cap is a tube for carrying oil to the bearings for the motor shaft through a sump provided on the inside of the dust cap. In one form of the invention each end cap is provided with an annular flange on the outside for resiliently supporting the motor on a U-shaped base. The cap for the oil tube is secured thereto by a cord or hinge to provide an integral connection.

Various modes of carrying out the invention are contemplated as being within the scope of the following claims particularly pointing out and distinctly claiming the subject matter which is regarded as the invention.

I claim:

1. An oil and dust cap for assembly with a dynamoelectric machine having a stator defining a bore, a rotor secured to a shaft extending in said bore, and at least one bearing supporting the shaft in the bore, and a shell surrounding the stator and an end frame secured thereto and receiving said shaft and supporting the bearing and an oil receiving wick, said oil and dust cap characterized by a one-piece plastic construction having a hub assembled around the shaft at the end of the bore with a radially projecting wall extending therefrom and providing a dust cap over the outer end of the motor, an oil tube integrally formed with the dust cap and extending to adjacent the circumference of the end frame to receive lubricating oil and carry the oil for delivery to said wick, means to close the upper end of the oil tube, and means securing the dust cap to the end frame.

2. The construction of claim 1, and a curved flange integrally provided at the inner upper end of the dust cap to provide a sump to receive oil from the oil tube and gradually dispense the oil to said wick.

3. The construction of claim 1, and the means closing the upper end of the oil tube comprising a plug connected to the oil tube by a plastic cord.

4. The construction of claim 1, and the means closing the upper end of the oil tube comprising a plug integrally joined to the oil tube by a molded hinge.

5. The construction of claim 1, and the means securing the oil and dust cap to the end frame consisting of a plurality of bolts or screws.

6. The construction of claim 1, and the means securing the oil and dust cap to the end frame consisting of a plurality of bosses integrally formed on the inside of the outer portion of the cap and extending through holes in the end frame and staked thereto 7. The construction of claim 1, and the oil and dust cap having an integrally formed outwardly extending annular flange integrally therewith around the hub of the dust cap, abutment means on the inside of the flange to reinforce the flange, an annular resilient mount assembled over the annular flange, a base member of a saddle-like shape at the upper portion engaging the annular resilient mount, and clip means securing the base member to the resilient mount.

* * * * *